United States Patent
Chang-Chian et al.

(10) Patent No.: US 9,489,166 B2
(45) Date of Patent: Nov. 8, 2016

(54) DATA TRANSMISSION METHOD AND DISPLAY DRIVING SYSTEM

(75) Inventors: Po-Chuan Chang-Chian, Hsinchu (TW); Chun-Yi Chou, Hsinchu (TW); Wing-Kai Tang, Hsinchu (TW); Ching-Chun Lin, New Taipei (TW); Kai-I Dai, Taoyuan (TW); Shu-Wei Chang, New Taipei (TW); Chih-Wei Tang, Penghu County (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 134 days.

(21) Appl. No.: 13/492,212

(22) Filed: Jun. 8, 2012

(65) Prior Publication Data

US 2013/0044089 A1  Feb. 21, 2013

Related U.S. Application Data

(63) Continuation-in-part of application No. 13/451,018, filed on Apr. 19, 2012.

(30) Foreign Application Priority Data

Aug. 19, 2011 (TW) .................................. 100129803

(51) Int. Cl.
*G06F 3/14* (2006.01)
*G09G 5/00* (2006.01)
(Continued)

(52) U.S. Cl.
CPC ................ *G06F 3/1431* (2013.01); *G09G 5/00* (2013.01); *G06F 3/1446* (2013.01); *G09G 3/3688* (2013.01); *G09G 5/006* (2013.01); *G09G 5/12* (2013.01); *G09G 2370/10* (2013.01)

(58) Field of Classification Search
CPC .... G09G 5/227; G09G 5/391; G09G 3/3685; G09G 1/007; G09G 2310/0264; G09G 2310/0283; G09G 3/18; G06F 3/14; G06F 3/038
See application file for complete search history.

(56) References Cited

U.S. PATENT DOCUMENTS 7,995,003 B1  8/2011 Diard et al.
8,537,166 B1 *  9/2013 Diard et al. .................. 345/502
(Continued)

FOREIGN PATENT DOCUMENTS

| CN | 201608820 U | 10/2010 |
| CN | 101937325 A | 1/2011 |
| TW | 200710781 A | 3/2007 |

OTHER PUBLICATIONS

Chinese Office Action dated Jul. 17, 2015.
(Continued)

*Primary Examiner* — Kent Chang
*Assistant Examiner* — Sujit Shah
(74) *Attorney, Agent, or Firm* — Rabin & Berdo, P.C.

(57) ABSTRACT

A data transmission method applied in a display, which includes a display panel, is provided. The data transmission method includes the following steps of: providing a host controller and n display drivers, n is a natural number greater than 1; providing a communication link under mobile industry processor interface (MIPI), connecting the host controller to the n display drivers; determining n virtual channel values Vc1-Vcn corresponding to the respective n display drivers; employing the host controller for providing a command with a virtual channel parameter through the communication link under MIPI; when the virtual channel parameter corresponds to an $i^{th}$ virtual channel values Vci, an $i^{th}$ display driver executing corresponding operations in response to the command, while the rest n−1 display drivers ignoring the command, wherein i is a natural number smaller than or equal to n.

26 Claims, 8 Drawing Sheets

(51) Int. Cl.
G09G 3/36 (2006.01)
G09G 5/12 (2006.01)

(56) References Cited

U.S. PATENT DOCUMENTS

| | | | |
|---|---|---|---|
| 2005/0116960 A1* | 6/2005 | Shioda et al. | 345/545 |
| 2007/0063960 A1* | 3/2007 | Iida et al. | 345/100 |
| 2008/0234005 A1* | 9/2008 | Schindler et al. | 455/566 |
| 2009/0033650 A1 | 2/2009 | Takeda | |
| 2010/0039410 A1* | 2/2010 | Becker et al. | 345/204 |
| 2010/0309173 A1* | 12/2010 | Matsuda et al. | 345/204 |
| 2010/0315406 A1* | 12/2010 | Nose et al. | 345/212 |
| 2011/0157193 A1* | 6/2011 | Boucher et al. | 345/505 |
| 2011/0157256 A1* | 6/2011 | Sakamoto | 345/690 |
| 2011/0242120 A1* | 10/2011 | Akai et al. | 345/531 |
| 2012/0110215 A1* | 5/2012 | Tai | 710/14 |
| 2012/0242628 A1* | 9/2012 | Yuan et al. | 345/204 |
| 2013/0044089 A1 | 2/2013 | Chang-Chian et al. | |

OTHER PUBLICATIONS

Chinese Office Action dated Nov. 4, 2014.

* cited by examiner

DATA TRANSMISSION METHOD AND DISPLAY DRIVING SYSTEM

This is a continuation-in-part application of U.S. application Ser. No. 13/451,018, filed Apr. 19, 2012, which claims the benefit of Taiwan application Serial No. 100129803, filed Aug. 19, 2011, the disclosure of which is incorporated by reference herein in its entirety.

BACKGROUND OF THE INVENTION

1. Field of the Invention

The invention relates in general to a data transmission method and display driving system using the same, and more particularly to a data transmission method and display driving system applied on a communication link under mobile industry processor interface (MIPI).

2. Description of the Related Art

In the present age, small-sized or medium-sized display have been widely applied in various kind of electronic products, such as mobile phones, personal digital assistants (PDA), multi-media players, GPS navigation devices, and so forth. Generally, a single display driver is employed in small or medium sized displays for achieving scan driving and data driving operation of the display panel.

However, drawbacks, such as the limited data channel numbers and the incapability for supporting display panels with higher resolution due to the limited size of the driver IC, rises in displays employing the present solution of a single display driver. As such, how to provide a display driving system capable of supporting more data channel numbers and display panel with higher resolution has became a prominent object for the industries.

SUMMARY OF THE INVENTION

The invention is directed to a data transmission method and a display driving system using the same, wherein multiple display drivers, each of which is configured with a virtual channel value, have been applied in the data transmission method and the display driving system for driving a display panel. The data transmission method and the display driving system directed to by the invention further employ a host controller for providing a command, with virtual channel address capability, under mobile industry processor interface (MIPI), so as to address and accordingly drive the multiple display drivers. Thus, in comparison to conventional display driving solution employing a single display driver, the data transmission method and display driving system using the same, directed to by the invention, are advantageously capable of supporting higher amount of data driving channels and display panels with higher resolution.

According to a first aspect of the present invention, a data transmission method, applied in a display having a host controller and n display drivers, wherein n is a natural number greater than 1. The data transmission method includes the steps of: providing a communication link under mobile industry processor interface (MIPI) between the host controller and the n display drivers; determining n virtual channel values Vc1, Vc2, . . . , and Vcn corresponding to the respective n display drivers; receiving a control command via the communication link under MIPI from the host controller, wherein the control command comprises a virtual channel parameter; an $i^{th}$ display driver among the n display drivers operating according to the control command when the virtual channel parameter of the control command indicates an $i^{th}$ virtual channel values Vci among the n virtual channel values, wherein i is a natural number smaller than or equal to n; and the rest n−1 display drivers among the n display drivers discarding the control command when the virtual channel parameter of the control command indicates the $i^{th}$ virtual channel values Vci.

According to a second aspect of the invention, a display driving system, applied in a display with a display panel, is provided. The display driving system includes a host controller and n display drivers, wherein n is a natural number greater than 1. The host controller provides a control command via a communication link under mobile industry processor interface (MIPI), wherein the control command comprises a virtual channel parameter. The n display drivers correspond to n respective virtual channel values Vc1, Vc2, . . . , and Vcn. An $i^{th}$ display driver among the n display drivers operates according to the control command when the virtual channel parameter of the control command indicates an $i^{th}$ virtual channel values Vci among the n virtual channel values, wherein i is a natural number smaller than or equal to n. The rest n−1 display drivers among the n display drivers discarding the control command when the virtual channel parameter of the control command indicates the $i^{th}$ virtual channel values Vci.

The invention will become apparent from the following detailed description of the preferred but non-limiting embodiments. The following description is made with reference to the accompanying drawings.

DETAILED DESCRIPTION OF THE INVENTION

First Embodiment

The display driving system according to the present embodiment of the invention employs multiple display drivers for driving a display panel, wherein each of the display drivers is configured with a virtual channel value for the purpose of addressing.

Figure 1:
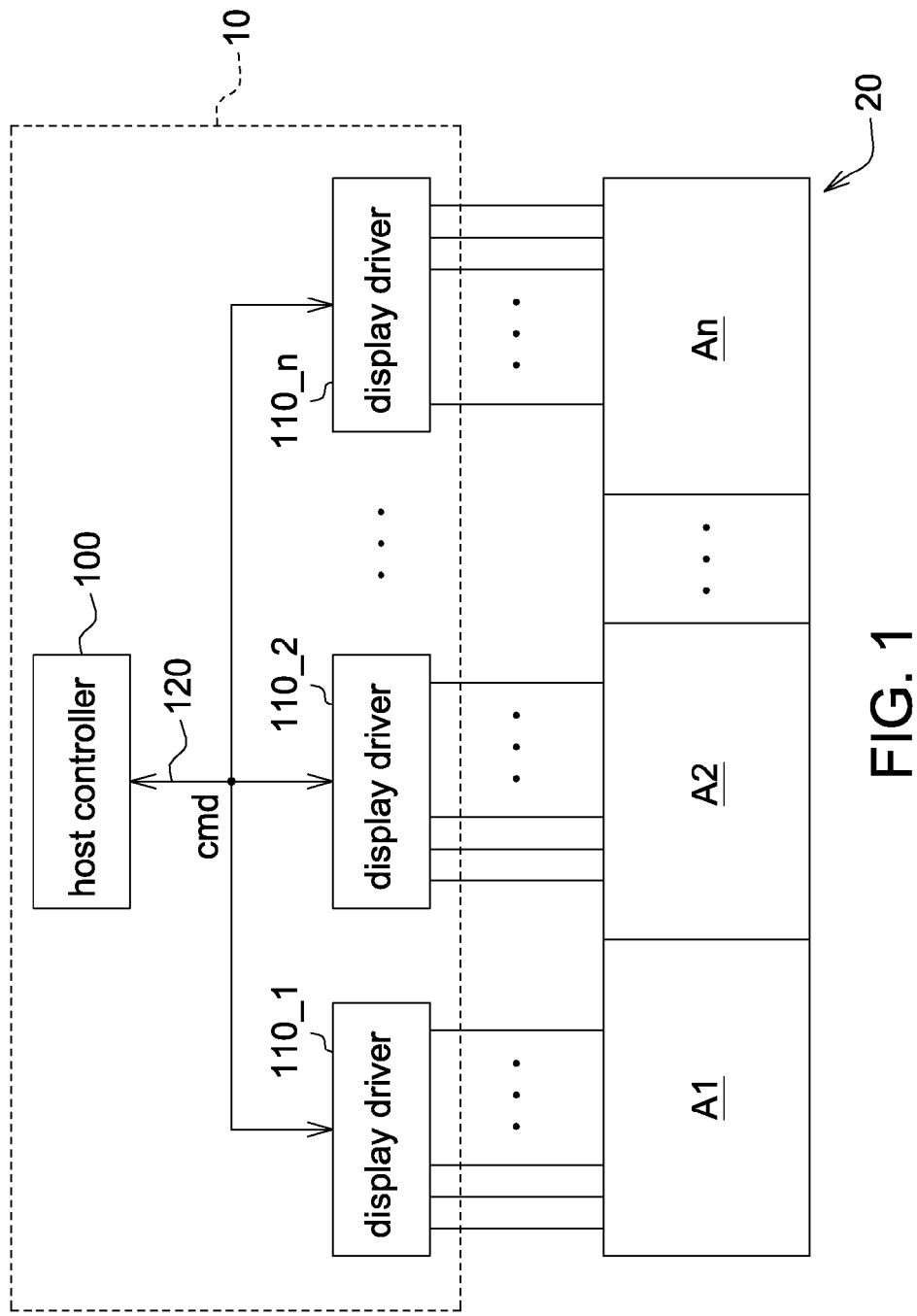
FIG. 1 is a block diagram of a display driving system of a display according to an embodiment of the invention.

Referring to FIG. 1, a block diagram of a display employing a display driving system according to a first embodiment of the invention is shown. The display 1 includes a display driving system 10 and a display panel 20. For example, the display panel 20 includes n panel regions A1, A2, . . . , and An, each of which corresponds to a same area and resolution, wherein n is a natural number greater than 1. In an example, n is equal to 3 and the display panel corresponds to a resolution of 1920 by 1080, so that each of the n panel regions A1 to A3 corresponds to a resolution of 640 by 1080.

The display driving system 10 includes a host controller 100 and n display drivers 110_1, 110_2, . . . , and 110_n. The host controller 110 includes a host controller 100 and n display drivers 110_1, 110_2, . . . , and 110_n. The host controller 100 provides a control command cmd via a communication link under mobile industry processor interface (MIPI) 120, wherein the control command cmd comprises a virtual channel parameter. For example, the control command cmd is defined in a display command set (DCS), such as a data transmission request command, a read request command, an indication command of a tearing effect event, an address configuration command for a random access memory, or a data write command.

The n display drivers 110_1 to 110_n respectively determine n virtual channel values Vc1, Vc2, . . . , and Vcn. In an example, n is equal to 3, and the virtual channel values Vc1 to Vc3 respectively correspond to values of 1, 2, and 3. In an example, the virtual channel values Vc1 to Vcn of the display drivers 110_1 to 110_n can be determined by means of a hardware pin configuration, a register programming of the display drivers, or a multi-time programming (MTP) of the corresponding display drivers 110_1 to 110_n. In other words, the virtual channel values Vc1 to Vcn are predetermined, so that command addressing for each of the n display drivers 110_1 to 110_n can be achieved afterward.

When the virtual channel parameter of the control command cmd corresponds to an $i^{th}$ virtual channel value Vci among the n virtual channel values Vc1 to Vcn, the display driver 110_i, corresponding to the $i^{th}$ virtual channel value Vci, operates in response to the control command cmd, while the rest n−1 display drivers accordingly discard the control command cmd, wherein i is a natural number smaller than or equal to n. As such, the display driving system 10 according to the present embodiment of the invention is capable of addressing the control command cmd, provided via the communication link under MIPI 120, by means of configuring the aforementioned virtual channel parameter, so as to have the n display drivers 110_1 to 110_n properly driven.

In the following paragraphs, examples are cited for more clearly having varies operations, achieved with the control command cmd, illustrated.

Data Transmission Request Command and Read Request Command

In a practical example, the control command cmd is a data transmission command or a read request command. As such, the display driver 110_i sends a confirmation signal in response to the data transmission request command, so as to have the host controller 100 noticed that whether a data transmission operation indicated by the data transmission request command is achieved. For example, the operation sequence that the host controller 100 provides the data transmission command and the display driver 110_i accordingly responds with the confirmation signal is illustrated in FIG. 2.

Figure 2:
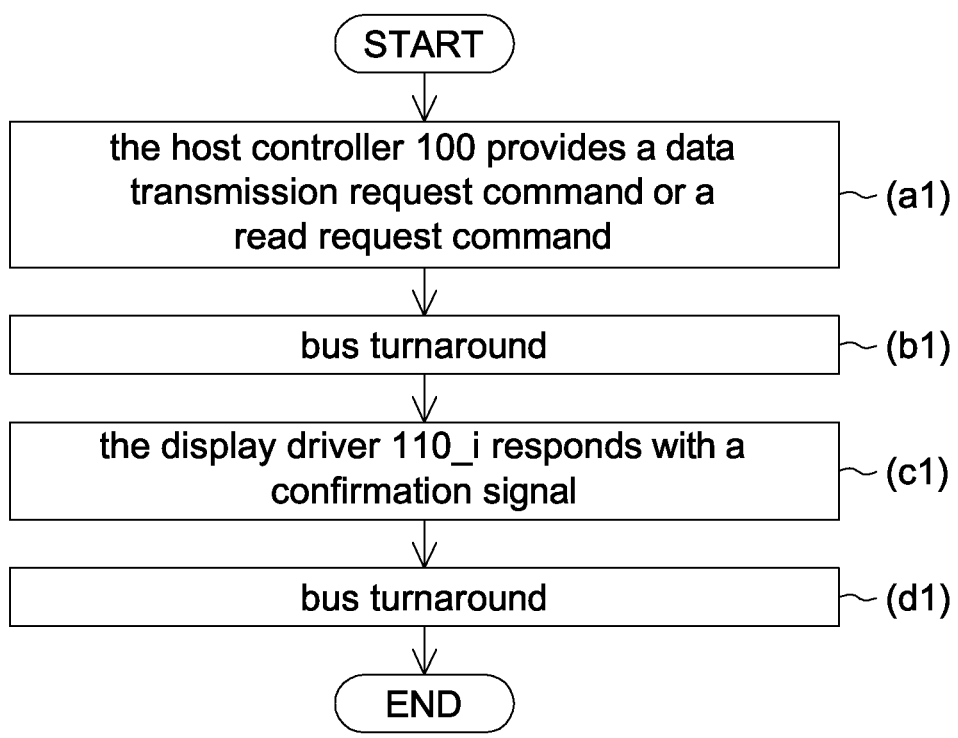
FIG. 2 is a flow chart of the display driving system according to the present embodiment of the invention when the control command cmd is a data transmission request command.

More specifically, the sequence, illustrated in FIG. 2, firstly proceeds to step (a1), in which the host controller 100 provides the data transmission request command, and the virtual channel parameter provided with the data transmission request command indicates the virtual channel value Vci. Next, the sequence proceeds to step (b1), in which the host controller 100 and the display driver 110_i enter a bus turnaround period, wherein the master position of the communication link under MIPI 120, currently taken by the host controller 100, is switched to the display driver 110_i. The sequence then proceeds to step (c1), in which the display driver 110_i sends the confirmation signal to the host controller 100 via the communication link under MIPI 120. After that, the sequence proceeds to step (d1), in which the host controller 100 and the display driver 110_i enter the bus turnaround period once again, so that the master position of the communication link under MIPI 120, currently taken by the display driver 110_i, is switched back to the host controller 100.

Indication Command of a Tearing Effect Event

In another practical example, the control command cmd is an indication command of a tearing effect event, and the virtual channel parameter accordingly corresponds to the virtual channel value Vc1 among the n virtual channel values Vc1 to Vcn. As such, the display driving system 10 could achieve indication and response of the tearing effect event via the first display driver 110_1.

The display driver 110_1 sends a confirmation signal, indicating that whether the host controller 100 is able to provide display data corresponding to a next frame, in response to the indication command of the tearing effect event. For example, the operation sequence that the host controller 100 provides the indication command of the tearing effect event and the display driver 110_1 accordingly responds with the confirmation signal is illustrated in FIG. 3.

Figure 3:
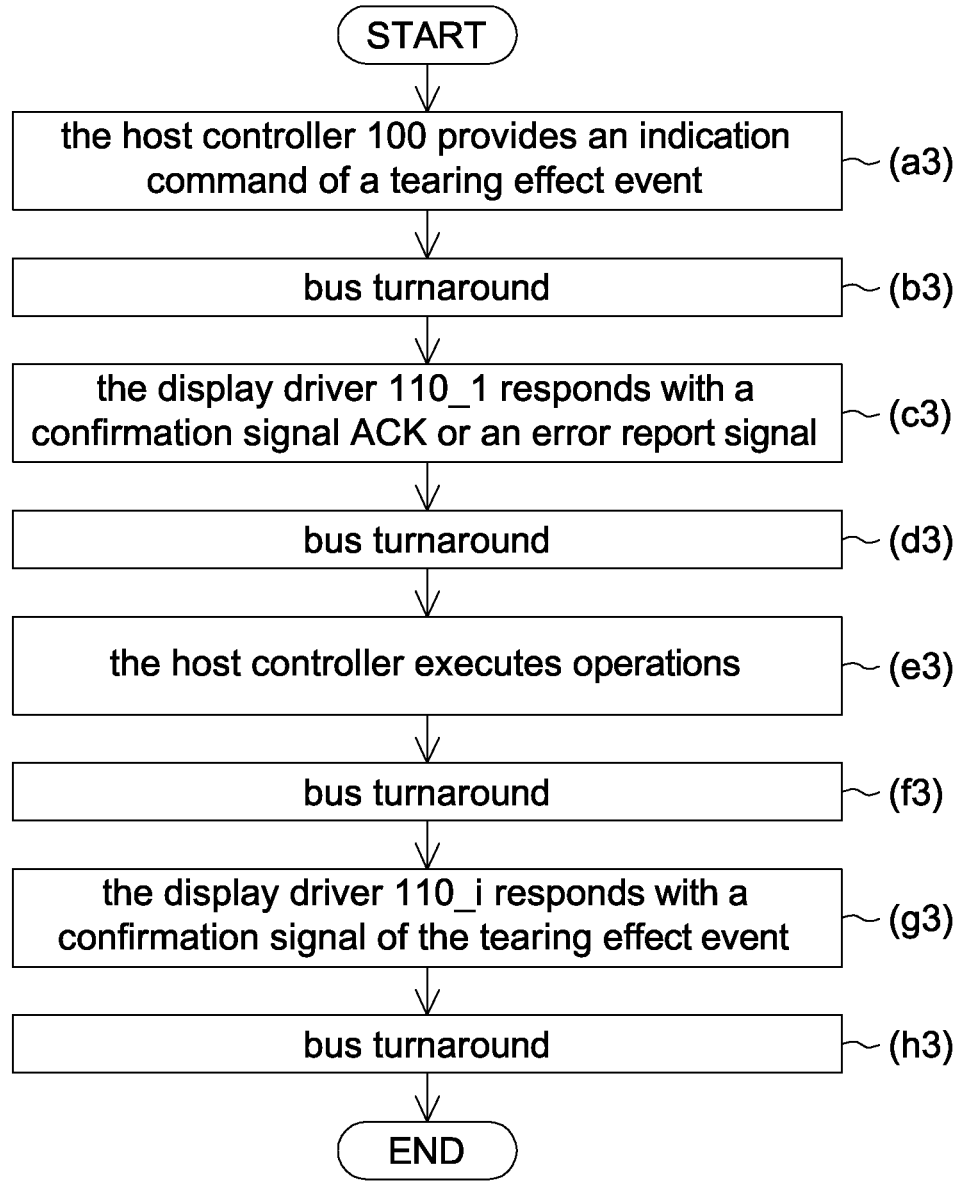
FIG. 3 is a flow chart of the display driving system according to the present embodiment of the invention when the control command cmd is an indication command of a tearing effect event.

More specifically, the sequence, illustrated in FIG. 3, firstly proceeds to step (a3), in which the host controller 100 provides the indication command of the tearing effect event, and the virtual channel parameter of the indication command indicates the virtual channel value Vc1. The sequence next proceeds to step (b3), in which the host controller 100 and the display driver 110_1 enter a bus turnaround period, wherein the master position of the communication link under MIPI 120, currently taken by the host controller 100, is switched to the display driver 110_1. The sequence then proceeds to step (c3), in which the display driver 110_1 sends a confirmation signal ACK or an error report signal to the host controller 100 via the communication link under MIPI 120. After that, the sequence proceeds to step (d3), in which the host controller 100 and the display driver 110_1 enter the bus turnaround period once again, so that the master position of the communication link under MIPI 120, currently taken by the display driver 110_1, is switched back to the host controller 100.

The sequence next proceeds to steps (e3), (f3), (g3), and (h3), wherein steps (e3), (f3), and (h3), with the control operation of the host controller 100, the master position of the communication link under MIPI 120 switched to the display driver 110_1, and then switched back to the host controller 100, are respectively similar to steps (a3), (b3), and (d3). In step (g3), the display driver 110_1 provides and sends a confirmation signal of the tearing effect event back to the host controller 100.

Address Configuration Command for a Random Access Memory and Data Write Command

In still another practical example, the control command cmd is an address configuration command for the RAM or a data write command. For example, each of the display drivers 110_1 to 110_n includes a RAM (not shown), and the $i^{th}$ display driver 110_i having data storage space of its RAM configured in response to the address configuration command, and having data written into the data storage space in response to the data write command. For example, the aforementioned address configuration of memory is executed under a command mode of the MIPI by the host controller 100 and the display driver 110_i, so as to achieve data transmission of the display data.

Figure 4:
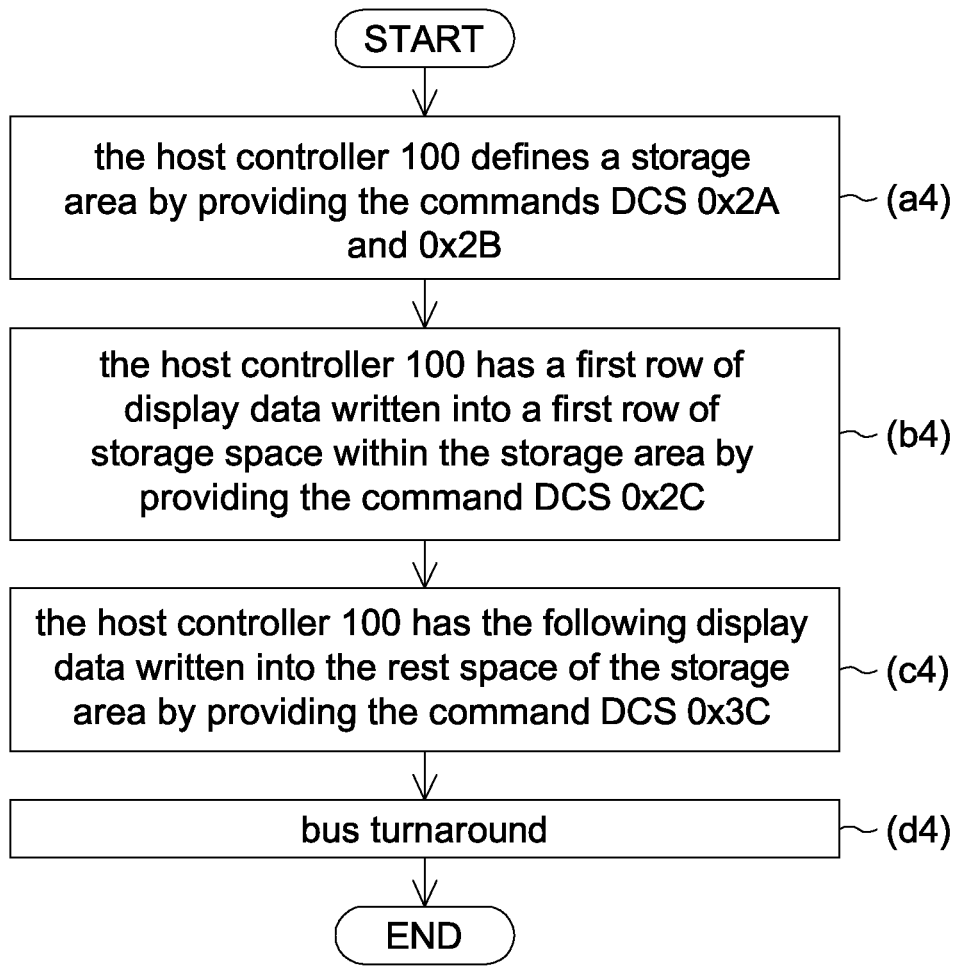
FIG. 4 is a flow chart of the display driving system according to the present embodiment of the invention when the control command cmd is an address configuration command of a random access memory and a data write command.

For example, the address configuration command for the RAM is defined in the DCS as commands 0x2A and 0x2B, and the data write command is defined in the DCS as commands 0x2C and 0x3C. The operation sequence that the host controller 100 provides the address configuration command for the RAM and the data write command is illustrated in FIG. 4.

The sequence firstly proceeds to step (a4), in which the host controller 100 provides the address configuration commands DCS 0x2A and 0x2B for defining a storage area within the RAM of the display driver 110_i, wherein the commands DCS 0x2A and 0x2B respectively having an initial address and a terminal address of the storage area determined. The sequence next proceeds to step (b4), in which the host controller 100 provides the data write command DCS 0x2C for having a first row of display data written into a first row of storage space within the storage area. The sequence then proceeds to step (c4), in which the host controller 100 provides the data write command DCS 0x3C for having the following display data written into the rest space of the storage area. After that, the sequence proceeds to step (d4), in which the host controller 100 and the display driver 110_i once again enter the bus turnaround period.

System Idle State

Figure 5:
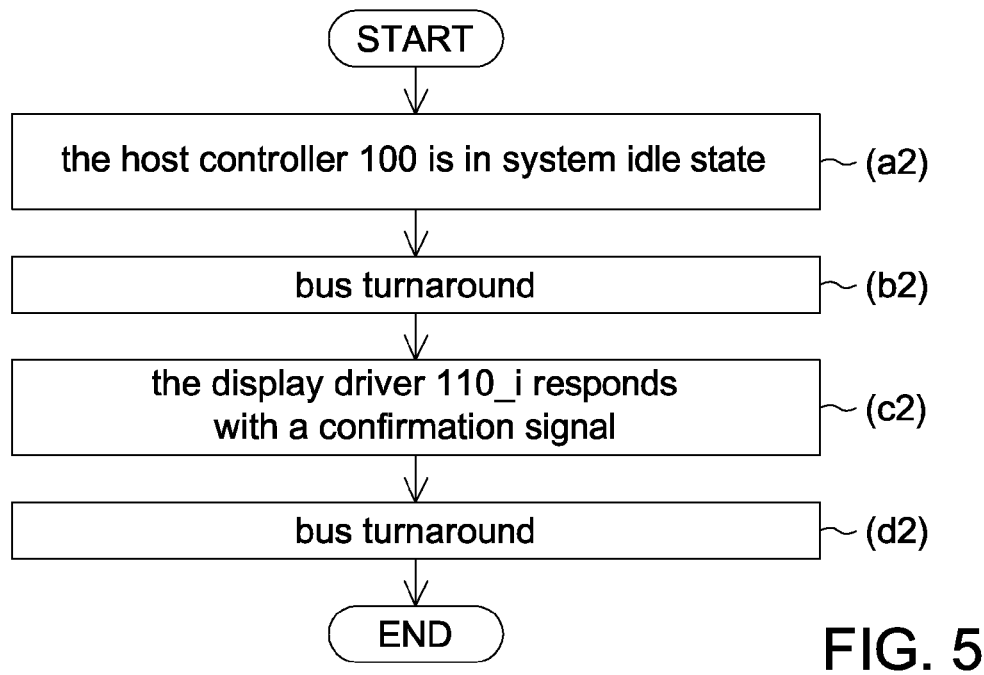
FIG. 5 is a flow chart of the display driving system according to the present embodiment of the invention when the host controller 100 operates in a system idle state.

In a practical example, the host controller 100 operates in a system idle state, in which, for example, the display 1 is turned on and no command has ever been provided. In the present situation, the display driver 110_i sends a confirmation signal, wherein the parameter i could be any initial value preset in the system. The host controller 100, for example, determines whether the communication link under MIPI 120 operates normally according to the confirmation signal sent by the display driver 110_i. For example, the operation sequence that the display driver 110_i sends the confirmation signal under the system idle condition is illustrated in FIG. 5, wherein steps (a2) to (d2) are respectively similar to steps (a1) to (d1) illustrated in FIG. 2, and the detail description is accordingly omitted for conciseness.

Data Write Command in Video Mode

Though only the situation that the virtual channel parameter of the control command cmd is selectively corresponding to each of the virtual channel values Vc1 to Vcn is illustrated in the present embodiment, the control command cmd is not limited thereto. In other example, the virtual channel parameter of the control command cmd could correspond to other values, so as to have the display drivers 110_1 to 110_n controlled for other operation. For example, the n display drivers 110_1 to 110_n are further configured with a virtual broadcasting value Vcb, and the virtual channel parameter of the control command cmd could also correspond to the virtual broadcasting value Vcb for achieving broadcasting operation on all of the display drivers 110_1 to 110_n.

For example, when the virtual channel value of the control command cmd corresponds to the virtual broadcasting value Vcb, the n display drivers 110_1 to 110_n are all enabled and operate according to the control command cmd. As such, broadcasting operation among the n display drivers 110_1 to 110_n by the host controller 110 can be implemented.

Figure 6:
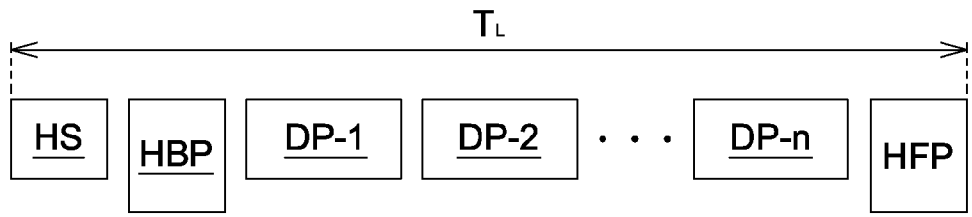
FIG. 6 is an illustration for video mode transmission of the display driving system according to an embodiment of the invention.

In a practical example, the control command cmd indicates a video mode transmission, as defined in MIPI interface, so that the host 100 provides display data, via the communication link under MIPI 120, to the n display drivers 110_1 to 110_n in a video mode. For example, the display data corresponding to a row of the display panel 20 is illustrated in FIG. 6, in which a horizontal start packet HS, a horizontal back porch packet HBP, pixel stream packets DP_1, DP_2, . . . , and DP_n, and a horizontal front porch packet HFP are transmitted via the communication link under MIPI 120 in a transmission time $T_L$.

The horizontal start packet HS, the horizontal back porch packet HBP, and the horizontal front porch packet HFP are assigned with a virtual channel parameter equal to the virtual broadcasting value Vcb, and the pixel stream packets DP_1 to DP_n are respectively assigned with virtual channel parameters equal to the virtual channel values Vc1 to Vcn.

Thus, the horizontal start packet HS, the horizontal back porch packet HBP, and the horizontal front porch packet HFP can be accessed by all each of the display drivers 110_1 to 110_n, while the pixel data, corresponding to each of the display drivers 110_1 to 110_n, can be accessed by the corresponding display drivers 110_1 to 110_n with reference to the virtual channel parameters.

Figure 7:
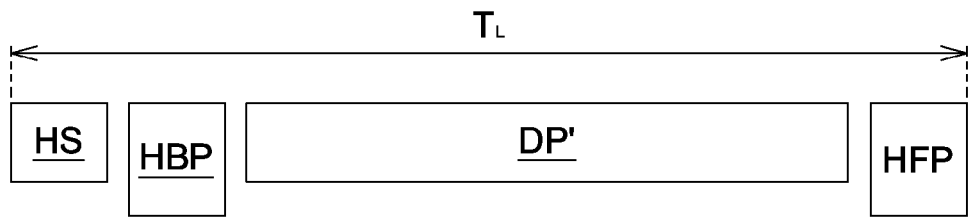
FIG. 7 is another illustration for video mode transmission of the display driving system according to an embodiment of the invention.

In still another practice, the display data corresponding to a row of the display panel 20 is illustrated in FIG. 7, in which a horizontal start packet HS, a horizontal back porch packet HBP, pixel stream packets DP', and a horizontal front porch packet HFP are transmitted via the communication link under MIPI 120. The display data shown in FIG. 7 is different from that of FIG. 6 in that only a piece of pixel stream packet DP', which is assigned with a virtual channel parameter equal to the virtual broadcasting value Vcb, is transmitted, so that every one of the packets provided by the host 100 can be accessed by each and every one of the n display drivers 110_1 to 110_n.

In the aforementioned situation, the n display drivers 110_1 to 110_n then have to identify and obtain pixel data corresponding to the corresponding panel regions A1 to An, so as to respectively achieve driving operations of the panel regions A1 to An. For example, each and every one of the n display drivers 110_1 to 110_n is provided with a register and a counter. The register is programmed to store a piece of location information indicating the horizontal panel region driven by the corresponding display drivers 110_1 to 110_n. Each and every one of the n display drivers 110_1 to 110_n further employs the counter to count clock cycles of a clock signal provided with the display data, so as to identify data packets corresponding to each of the panel regions A1 to An with reference to the location information.

In a practical example, the display panel 20 has the horizontal resolution of 1920, and the parameter n is equal to 3, and the register for the display drivers 110_1 to 110_3 respectively store horizontal location information of 0 to 639, 640 to 1279, and 1280 to 1919. In other words, the three pieces location information stored in each of the display drivers 110_1 to 110_3 indicate the corresponding panel regions A1 to A3.

The counter of the display drivers 110_1 to 110_3 then count clock cycles of the clock signal. The display drivers 110_1 to 110_3 respectively obtain the $0^{th}$ to the $639^{th}$, the $640^{th}$ to the $1279^{th}$, and the $1280^{th}$ to the $1919^{th}$ pieces of pixel data of the pixel stream packets DP' by means of comparing the corresponding counted clock cycle and the corresponding location information.

Figure 8:
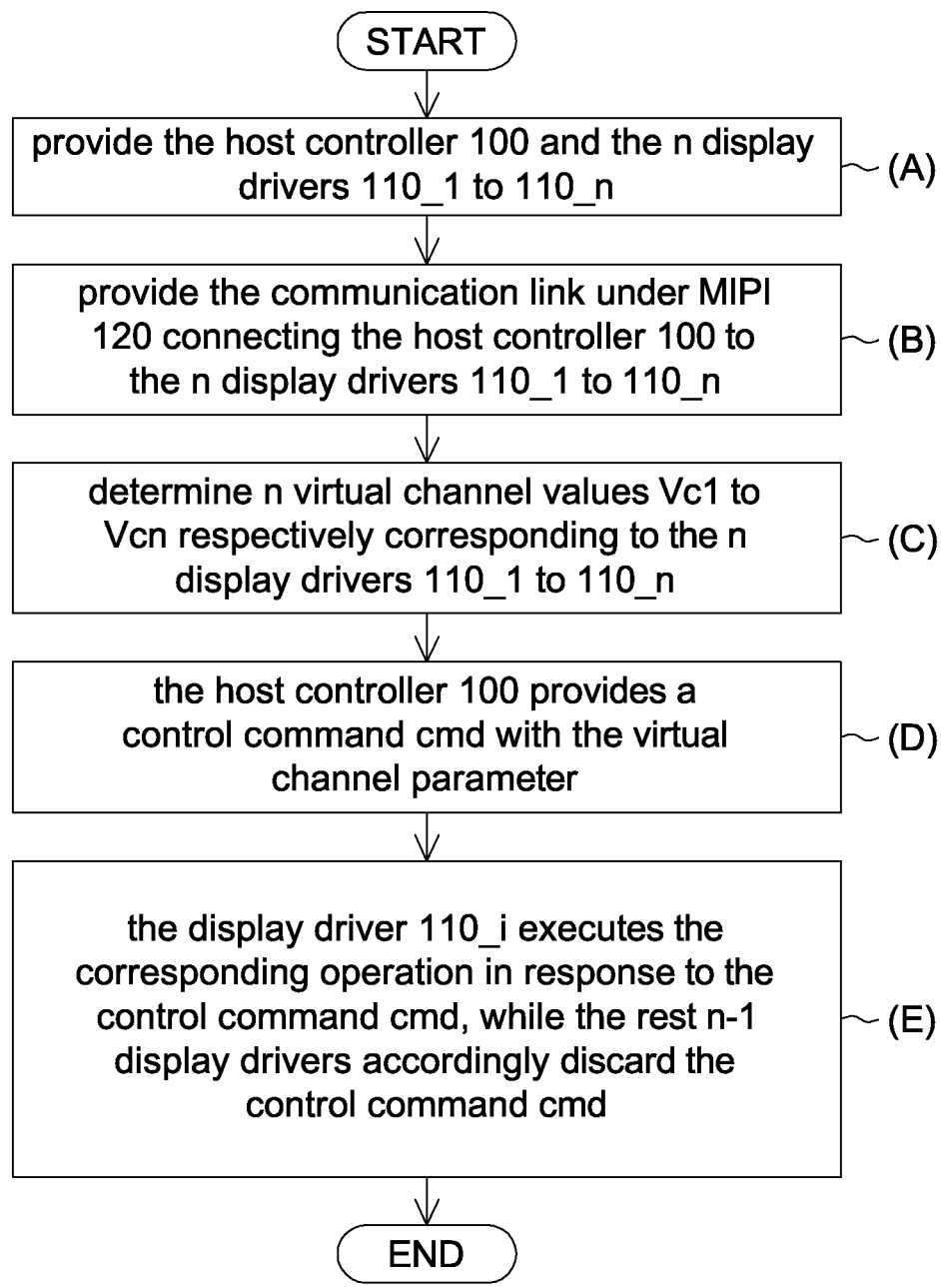
FIG. 8 is a flow chart of the data transmission method according to the present embodiment of the invention.

Referring to FIG. 8, a flow of the data transmission method according of the present embodiment is shown. For example, the data transmission method according to the present embodiment of the invention includes the following steps. Firstly, the data transmission method proceeds to step (A), in which the host controller 100 and the n display drivers 110_1 to 110_n is provided. The data transmission method next proceeds to step (B), in which the communication link under MIPI 120 is provided for connecting the host controller 100 to the n display drivers 110_1 to 110_n. The data transmission method then proceeds to step (C), in which n virtual channel values Vc1 to Vcn respectively corresponding to the n display drivers 110_1 to 110_n are determined. The data transmission method next proceeds to step (D), in which the host controller 100 provides a control command cmd with the virtual channel parameter via the communication link under MIPI 120. When the virtual channel parameter of the control command cmd indicates the virtual channel value Vci, the data transmission method proceeds to step (E), in which the display driver 110_i executes the corresponding operation in response to the control command cmd, while the rest n−1 display drivers accordingly discard the control command cmd.

Figure 9:
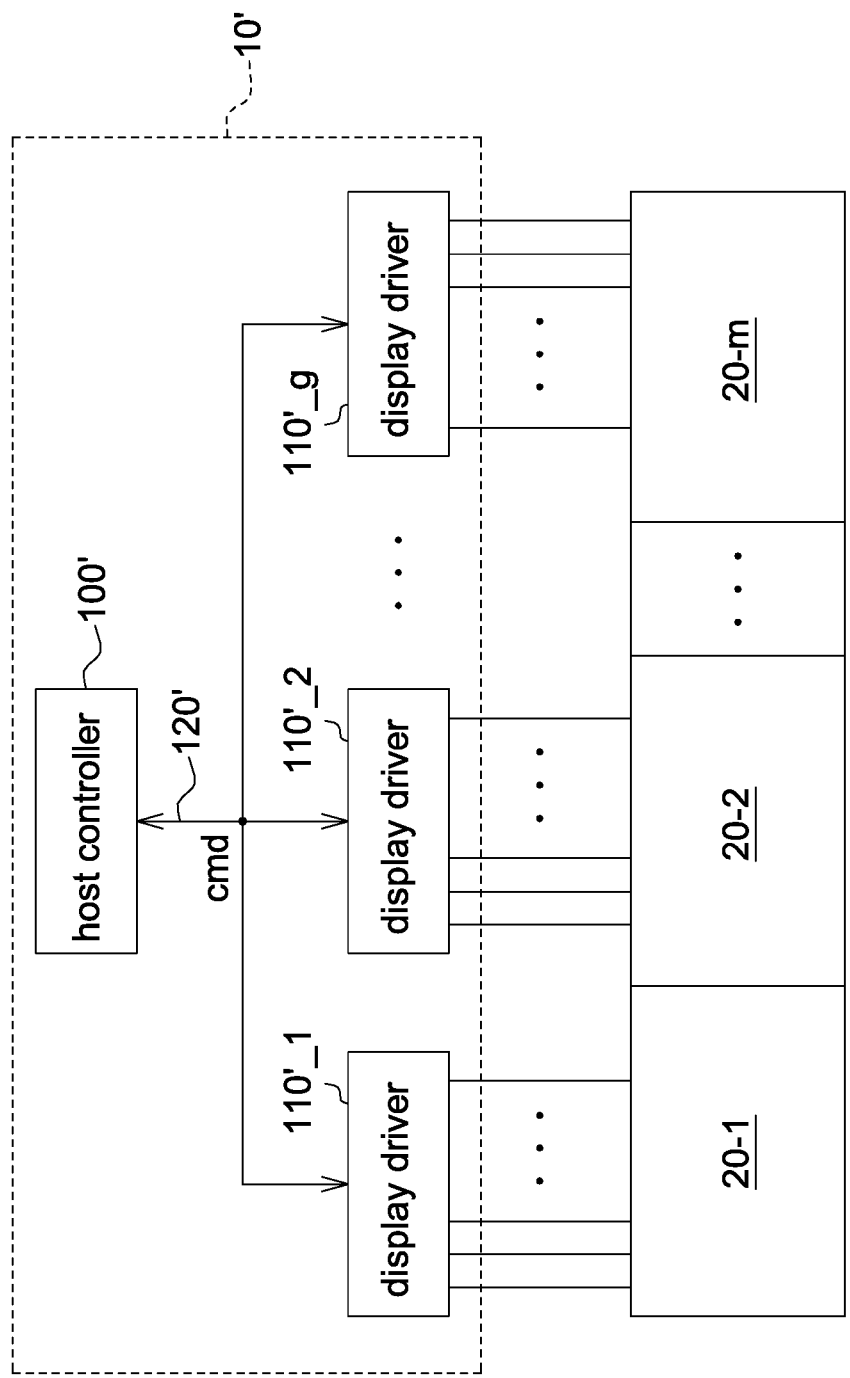
FIG. 9 is another block diagram of a display driving system of a display according to an embodiment of the invention

Though only the situation that the display 1 includes a display panel 20 is cited in the above embodiment, the display driving system is not limited thereto. In other example, the display 2 may also includes two or more than two display panels 20_1, 20_2, 20_3, . . . , and 20_m, wherein m is a natural number greater than 1, as illustrated in FIG. 9. Furthermore, the display driving system 10' of the display 2 includes q display drivers 110'_1, 110'_2, . . . , and 110'_q, wherein q is also a natural number greater than 1. Each of the display panels 20_1 to 20_m is driven by at least a display driver of the q display drivers 110'_1 to 110'_q, so that each of the display panels 20_1 to 20_m can be driven by the host 100' via one communication link under MIPI 120'.

In an example, the parameter q is equal to m. In other words, each of the display panels 20_1 to 20_m is driven by a display driver of the display 2. In still another example, the parameter q is greater than m. Thus, at least one of the display panels 20_1 to 20_m is driven by two or more than two of the display drivers 110'_1 to 110'_q, and the rest m−1 display panels 20_1 to 20_m may be selectively driven by one or more than one of the display drivers 110'_1 to 110'_q.

Second Embodiment

The display driving system according to the present embodiment of the invention further employs a synchronization scheme on the display drivers in such a way that only one designated display driver is configured as a master character to achieve bus turnaround operation, from the display drivers to the host controller 100", while the rest display drivers are configured as slave characters and configured in output-disabled mode by the designated display driver as the master character.

Figure 10:
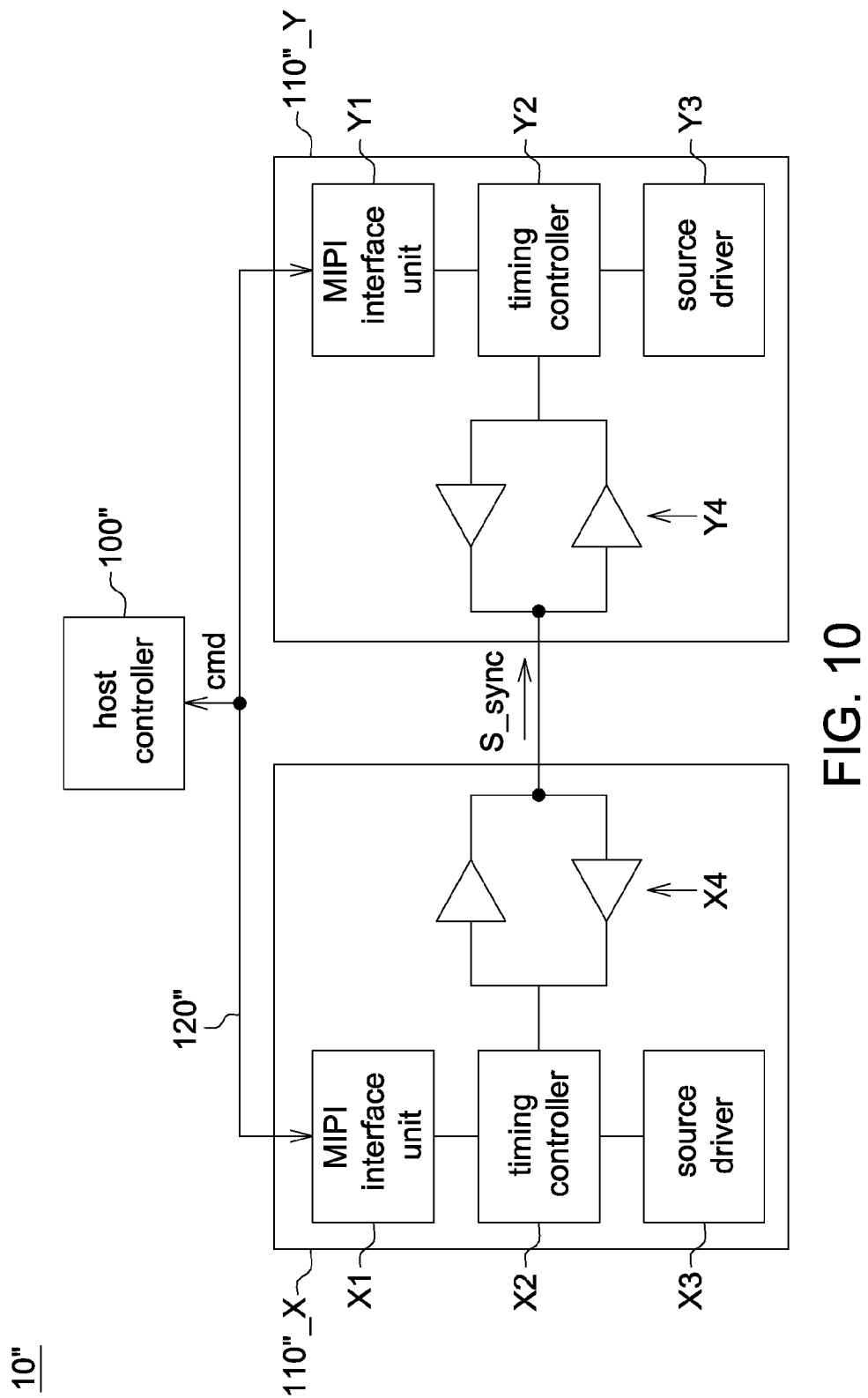
FIG. 10 is a detail block diagram of display drivers.

Referring to FIG. 10, a detail block diagram of display drivers is shown. Since all the output-disabled display drivers operate similarly, an exemplary example of one active display driver, e.g. display driver 110"_x, and one symbolic output-disabled display driver, e.g. display driver 110"_y, is discussed for further illustration, wherein the display driver 110"_y can be interpreted as a representation of a number of output-disabled display drivers with similar operations.

The display driving system 10" includes host controller 100", display drivers 110"_x and 110"_y, wherein the display drivers 110"_x and 110"_y are respectively designated as the master character and the slave character by means of a hardware pin configuration, a register programming of the display drivers, or a MTP operation of the corresponding display drivers 110"_x and 110"_y.

The display driver 110"_x includes a MIPI interface unit x1, a timing controller x2, a source driver x3, and an input/output unit x4. The timing controller x2 operates as a main controller of the display driver 110"_x, and is connected to the host controller 100", the corresponding panel region, and the display driver 110"_y respectively via the MIPI interface unit x1, the source driver x3, and the input/output unit x4. The display driver 110"_y includes a MIPI interface unit y1, a timing controller y2, a source driver y3, and an input/output unit y4, which operate similarly as the corresponding unit of the display driver 110"_x.

For example, the input/output unit x4 and y4 both include a TTL pin connector, so that TTL signals can be employed as a synchronization signal S_sync, which is transmitted between the display drivers 110"_x and 110"_y and accordingly achieves the synchronization scheme of the display drivers 110"_x and 110"_y.

In detail, when the virtual channel parameter of the control command cmd indicates the virtual broadcasting value Vcb, both of the display drivers 110"_x and 110"_y operate accordingly. Afterward, both of the display drivers 110"_x and 110"_y will carry out bus turnaround operation, so that the master position of the communication link under MIPI 120, currently taken by the host controller 100", is switched to the display drivers 110"_x and 110"_y. However, signals, fed back by the two display drivers 110"_x and 110"_y in the bus turnaround operation will interfere one another since the two display drivers 110"_x and 110"_y are connected to the host 100" via the same communication link under MIPI 120".

In order to prevent the aforementioned signal mutual interference, the display driver 110"_x is configured to provide the synchronization signal S_sync to the display driver 110"_y when the MIPI communication operation proceeds to the bus turnaround state. The timing controller y2 of the display driver 110"_y accordingly has the MIPI interface unit y1 of the display driver 110"_y configured in an output disable state in response to the synchronization signal. In other words, the feedback signal provided by the display driver 110"_y is blocked by the synchronization signal S_sync, so that only the feedback signal of the display driver 110"_x is transmitted via the communication link under MIPI 120". Thus, the signal interference among the feedback signals of the display drivers 110"_x and 110"_y can be avoided.

Though only the situation that the display driver 110"_x is predetermined as the master character for blocking the rest of display drivers of the display driving system 10" and achieving the MIPI bus turnaround operation with the host controller 100" is illustrated in the aforementioned embodiment, the display driving system 10" is not limited thereto. In other example, the display driver 110"_x playing the master character can be selectively determined by the host controller 100" by means of altering the hardware pin configuration, the register programming of the display drivers, or the MTP operation of the corresponding display drivers.

The data transmission method and the display driving system according to the present embodiment of the invention employ multiple display drivers, each of which is configured with a virtual channel value, for driving a display panel. The data transmission method and the display driving system according to the present embodiment of the invention further employ a host controller for providing a command, with virtual channel address capability, under MIPI, so as to address and accordingly drive the multiple display drivers. Thus, in comparison to conventional display driving solution employing a single display driver, the data transmission method and display driving system according to the present embodiment of the invention are advantageously capable of supporting higher amount of data driving channels and display panels with higher resolution.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data transmission method applied in a display having a host controller and n display drivers, wherein n is a natural number greater than 1, the data transmission method comprising:
    providing a communication link under Mobile Industry Processor Interface (MIPI) standards between the host controller and the n display drivers;
    determining n virtual channel values Vc1, Vc2, . . . , and Vcn corresponding to the respective n display drivers;
    receiving a control command via the communication link under MIPI standards from the host controller, wherein the control command comprises a virtual channel parameter;
    an $i^{th}$ display driver among the n display drivers operating according to the control command when the virtual channel parameter of the control command indicates an $i^{th}$ virtual channel value Vci among the n virtual channel values, where i is a natural number smaller than or equal to n;
    the remaining n−1 display drivers among the n display drivers discarding the control command when the virtual channel parameter of the control command indicates the $i^{th}$ virtual channel value Vci;
    wherein the respective virtual channel values corresponding to the n display drivers are assigned by means of a hardware pin configuration, a register programming of the display drivers, or a multi-time programming (MTP) of the display drivers;
    determining a virtual broadcasting value;
    configuring an $x^{th}$ display driver of the n display drivers to provide a synchronization signal when the virtual channel parameter of the control command indicates the virtual broadcasting value, where x is a natural number smaller than or equal to n;
    configuring the remaining n−1 of the n display drivers in an output disable state in response to the synchronization signal; and
    feeding a response back to the host via the communication link under MIPI standards by the $x^{th}$ display driver in a bus turnaround period.

2. The data transmission method according to claim 1, wherein the control command indicates a video mode transmission and the host provides display data to the n display drivers in a video mode, wherein each data packets provided by the host in the video mode is configured with the virtual broadcasting value, so that each and every data packets provided by the host can be accessed by each and every n display drivers.

3. The data transmission method according to claim 2, wherein the display comprises a display panel, the display panel is segmented into n horizontal panel regions, each of which is driven by one of the n display drivers, and the data transmission method further comprises:
    providing each of the n display drivers with a register, which is programmed to store a piece of location information indicating the corresponding horizontal panel region; and
    identifying data packets corresponding to each of the horizontal panel regions with reference to the location information by each of the n display drivers.

4. The data transmission method according to claim 1, wherein the control command indicates a video mode transmission and the host provides display data to the n display drivers in a video mode, wherein data packets provided by the host in the video mode is configured with one of the n virtual channel values, so that data packets provided by the host can be accessed by each of the corresponding n display drivers.

5. The data transmission method according to claim 1, wherein the control command corresponds to a data transmission request command, and the $i^{th}$ display driver sends a response confirmation signal, capable of having the host controller noticed as to whether a data transmission operation indicated by the data transmission request command is achieved, in response to the data transmission request command.

6. The data transmission method according to claim 1, wherein the control command corresponds to a read request command, and the $i^{th}$ display driver sends a response confirmation signal, capable of having the host controller noticed as to whether a data transmission operation indicated by the read request command is achieved, in response to the read request command.

7. The data transmission method according to claim 1, wherein when the host controller is in a system idle state, the $i^{th}$ display driver sends a response confirmation signal.

8. The data transmission method according to claim 1, wherein the control command corresponds to an indication command of a tearing effect event, and the $i^{th}$ display driver sends a response confirmation signal, capable of having the host controller noticed as to whether to provide display data corresponding to a next frame, in response to the indication command.

9. The data transmission method according to claim 8, wherein the virtual channel parameter of the control command corresponds to a first virtual channel value Vc1 among the n virtual channel values when the control command corresponds to the indication command of the tearing effect event.

10. The data transmission method according to claim 1, wherein the control command corresponds to an address configuration command for a random access memory (RAM) and the $i^{th}$ display driver comprises a RAM, and the $i^{th}$ display driver has the RAM configured with a data storage space in response to the address configuration command.

11. The data transmission method according to claim 10, wherein the control command further corresponds to a data write command, and the $i^{th}$ display driver has transmission data provided by the host controller written into the data storage space in response to the data write command.

12. The data transmission method according to claim 1, wherein the control command corresponds to a command defined in a display command set.

13. The data transmission method according to claim 1, wherein the display comprises a plurality of display panels, each of which is driven by at least one of the n display drivers.

14. A display driving system applied in a display, the display driving system comprising:
   a host controller, providing a control command via a communication link under Mobile Industry Processor Interface (MIPI) standards, wherein the control command comprises a virtual channel parameter; and
   n display drivers, corresponding to n respective virtual channel values Vc1, Vc2, . . . , and Vcn, wherein n is a natural number greater than 1, wherein,
   an $i^{th}$ display driver among the n display drivers operates according to the control command when the virtual channel parameter of the control command indicates an $i^{th}$ virtual channel value Vci among the n virtual channel values, where i is a natural number smaller than or equal to n;
   the remaining n−1 display drivers among the n display drivers discarding the control command when the virtual channel parameter of the control command indicates the $i^{th}$ virtual channel value Vci;
   wherein the respective virtual channel values corresponding to the n display drivers are assigned by means of a hardware pin configuration, a register programming of the display drivers, or a multi-time programming (MTP) of the display drivers;
   wherein an $x^{th}$ display driver of the n display drivers is configured to provide a synchronization signal when the virtual channel parameter of the control command indicates a virtual broadcasting value, and x is a natural number smaller than or equal to n;
   wherein the $x^{th}$ display driver further provides the synchronization signal to the remaining n−1 of the n display drivers, and has the remaining n−1 of the n display drivers configured in an output disable state when the virtual channel parameter of the control command indicates the virtual broadcasting value; and
   wherein the $x^{th}$ display driver further feeds a response back to the host via the communication link under MIPI standards in a bus turnaround period.

15. The display driving system according to claim 14, wherein the control command indicates a video mode transmission and the host provides display data to the n display drivers in a video mode, wherein,
   each data packets provided by the host in the video mode is configured with the virtual broadcasting value, so that each and every data packet provided by the host can be accessed by each and every one of the n display drivers.

16. The display driving system according to claim 15, wherein the display comprises a display panel, the display panel is segmented into n horizontal panel regions, each of which is driven by one of the n display drivers, wherein,
   each of the n display drivers further comprises a register, programmed to store a piece of location information indicating the corresponding horizontal panel region; and
   each of the n display drivers identifies data packets corresponding to each of the corresponding horizontal panel regions with reference to the location information.

17. The display driver system according to claim 14, wherein the control command indicates a video mode transmission, and the host provides display data to the n display drivers in a video mode, wherein,
   data packets provided by the host in the video mode are configured with one of the n virtual channel values, so that data packets provided by the host can be accessed by each of the corresponding n display drivers.

18. The display driving system according to claim 14, wherein the control command corresponds to a data transmission request command, and the $i^{th}$ display driver sends a response confirmation signal, capable of having the host controller noticed as to whether a data transmission operation indicated by the data transmission request command is achieved, in response to the data transmission request command.

19. The display driving system according to claim 14, wherein the control command corresponds to a read request command, and the $i^{th}$ display driver sends a response confirmation signal, capable of having the host controller noticed as to whether a data transmission operation indicated by the read request command is achieved, in response to the read request command.

20. The display driving system according to claim 14, wherein when the host controller is in a system idle state, the $i^{th}$ display driver sends a response confirmation signal.

21. The display driving system according to claim 14, wherein the control command corresponds to an indication command of a tearing effect event, and the $i^{th}$ display driver sends a response confirmation signal, capable of having the host controller noticed as to whether to provide display data corresponding to a next frame, in response to the indication command.

22. The display driving method according to claim 21, wherein the virtual channel parameter of the control command corresponds to a first virtual channel value Vc1 among the n virtual channel values when the control command corresponds to the indication command of the tearing effect event.

23. The display driving method according to claim 14, wherein the control command corresponds to an address configuration command for a random access memory (RAM), the $i^{th}$ display driver comprises a RAM, and the $i^{th}$ display driver has the RAM configured with a data storage space in response to the address configuration command.

24. The display driving system according to claim 23, wherein the control command further corresponds to a data write command, and the $i^{th}$ display driver has transmission data provided by the host controller written into the data storage space in response to the data write command.

25. The display driving system according to claim 14, wherein the control command corresponds to a command defined in a display command set.

26. The display driving system according to claim 14, wherein the display comprises a plurality of display panels, each of which is driven by at least one of the n display drivers.

* * * * *